(12) United States Patent
Rocha Mercado et al.

(10) Patent No.: US 11,658,594 B2
(45) Date of Patent: May 23, 2023

(54) SYSTEM AND METHOD TO DETECT LOW SPEED IN A GAS TURBINE GENERATOR

(71) Applicant: GENERAL ELECTRIC COMPANY, Schenectady, NY (US)

(72) Inventors: Boris Henry Rocha Mercado, Queretaro (MX); Jorge Fabian Soria Ortiz, Queretaro (MX); Hector Javier Herrera, Houston, TX (US); John Thanh Nguyen, Humble, TX (US); Nam Thanh Tran, Tomball, TX (US); Joel Keith Trombley, Houston, TX (US); Randall John Kleen, Channelview, TX (US)

(73) Assignee: General Electric Company, Schenectady, NY (US)

(*) Notice: Subject to any disclaimer, the term of this patent is extended or adjusted under 35 U.S.C. 154(b) by 649 days.

(21) Appl. No.: 16/658,772

(22) Filed: Oct. 21, 2019

(65) Prior Publication Data

US 2021/0119561 A1    Apr. 22, 2021

(51) Int. Cl.
*H02P 9/08* (2006.01)
*F01D 15/10* (2006.01)
*F01D 17/06* (2006.01)
*F02D 31/00* (2006.01)
*F03D 7/04* (2006.01)
*G05B 13/04* (2006.01)
*H02P 101/25* (2016.01)

(52) U.S. Cl.
CPC ............... *H02P 9/08* (2013.01); *F01D 15/10* (2013.01); *F01D 17/06* (2013.01); *F02D 31/001* (2013.01); *F03D 7/045* (2013.01); *G05B 13/04* (2013.01); *F05D 2220/76* (2013.01); *G05B 2219/2619* (2013.01); *H02P 2101/25* (2015.01); *H02P 2201/03* (2013.01)

(58) Field of Classification Search
None
See application file for complete search history.

(56) References Cited

U.S. PATENT DOCUMENTS

| 3,753,069 | A  | 8/1973 | Newton |
| 4,254,344 | A  | 3/1981 | Fancy et al. |
| 6,014,324 | A  | 1/2000 | Deck |
| 6,768,277 | B2 | 7/2004 | Ichinose et al. |
| 7,015,595 | B2 | 3/2006 | Fedderson et al. |

(Continued)

OTHER PUBLICATIONS

International Search Report/Written Opinion; PCT/US2020/55367; dated Jan. 19, 2021; 15 pages.

(Continued)

*Primary Examiner* — Sean Shechtman
(74) *Attorney, Agent, or Firm* — Fletcher Yoder, P.C.

(57) ABSTRACT

A control system for a power generation system includes a generator coupled to a turbine via a shaft. The control system includes a memory storing instructions. The control system also includes a processor coupled to the memory and configured to execute the instructions. When the instructions are executed it causes the processor to receive a direct current (DC)-link voltage from an automatic voltage regulator (AVR), wherein the AVR is configured to control voltage characteristics of the generator, and to determine a speed of the generator based on the DC-link voltage.

15 Claims, 2 Drawing Sheets

(56) References Cited

U.S. PATENT DOCUMENTS

| | | |
|---|---|---|
| 7,586,204 B2 | 9/2009 | Hess et al. |
| 9,252,695 B2 | 2/2016 | Benya, Jr. et al. |
| 9,391,554 B2 | 7/2016 | Li et al. |
| 9,982,607 B2 | 5/2018 | Argote et al. |
| 10,181,728 B2 | 1/2019 | Shakeel et al. |
| 2003/0151259 A1* | 8/2003 | Feddersen .................. H02P 9/04 290/44 |
| 2012/0056602 A1* | 3/2012 | Li ............................. H02P 9/48 322/89 |
| 2017/0279280 A1* | 9/2017 | Shakeel .................... H02J 3/42 |
| 2019/0296680 A1 | 9/2019 | Das et al. |

OTHER PUBLICATIONS

PCT International Preliminary Report for Application No. PCT/US2020/055367 dated May 5, 2022, 9 pgs.

* cited by examiner

SYSTEM AND METHOD TO DETECT LOW SPEED IN A GAS TURBINE GENERATOR

BACKGROUND

The subject matter disclosed herein relates to a gas turbine generator and, more particularly, to a system and method for detecting low speed in the gas turbine generator.

Generators are frequently used to provide electricity for a power grid to power one or more loads. A generator may operate at a certain voltage amplitude, phase, and frequency based on operation of a turbine, such as a gas turbine, steam turbine, or another prime mover. For example, a turbine may provide rotational energy to a shaft that rotates within the generator. The shaft may rotate based on various settings of the turbine, such as an amount of air and fuel entering the turbine. To export power to the power grid, the power generated by the generator is controlled to synchronize with the power on the power grid, and a circuit breaker is closed to electrically couple the generator with the power grid. That is, parameters of the power generated by the generator, such as voltage amplitude, phase, and frequency provided by the generator may be controlled to fall within a range of respective parameters of the grid, such as the voltage amplitude, phase, and frequency, before closing the circuit breaker.

Occasionally, the generator may be shut down and the speed of the generator and/or turbine needs to be monitored to determine when the generator has stopped. Additional hardware is required to monitor the low speeds of the generator. For example, a zero speed switch or speed actuating sensing switch may be utilized. However, the utilization of this additional hardware may not be cost effective.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

In a first embodiment, a control system for a power generation system includes a generator coupled to a turbine via a shaft. The control system includes a memory storing instructions. The control system also includes a processor coupled to the memory and configured to execute the instructions. When the instructions are executed it causes the processor to receive a direct current (DC)-link voltage from an automatic voltage regulator (AVR), wherein the AVR is configured to control voltage characteristics of the generator, and to determine a speed of the generator based on the DC-link voltage.

In a second embodiment, a non-transitory computer-readable medium includes instructions configured to be executed by a processor of a control system for a power generation system including a generator coupled to a turbine via shaft. The instructions include instructions configured to cause the processor to receive a direct current (DC)-link voltage from an automatic voltage regulator (AVR), wherein the AVR is configured to control voltage characteristics of the generator, and to determine a speed of the generator based on the DC-link voltage.

In a third embodiment, a power generation system includes a turbine, a generator coupled to the turbine via a shaft, and an automatic voltage regulator (AVR). The AVR is configured to control voltage characteristics of the generator. The power generation system is configured to receive a voltage from the AVR and to determine a speed of the generator based on the voltage.

BRIEF DESCRIPTION OF THE DRAWINGS

These and other features, aspects, and advantages of the present subject matter will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

Embodiments of the present disclosure provide a system and method for monitoring a speed of a generator and/or shaft coupling the generator to a prime mover (e.g., turbine) in a power generation system. The embodiments include a control system that receives a voltage (e.g., direct current (DC)-link voltage) from an automatic voltage regulator (AVR) that controls the voltage characteristics of the generator. The control system determines a speed of the generator and/or shaft from (e.g., directly from) the DC-link voltage. In certain embodiments, the control system may utilize a model algorithm and/or look-up table to determine the speed of the generator and/or shaft. Utilizing a measurement of the DC-link voltage provides a cost effective manner for monitoring low speeds (e.g., 50 revolution per minute (RPM) or less) of generator by eliminating the need of additional hardware for the monitoring of these low speeds.

Figure 1:
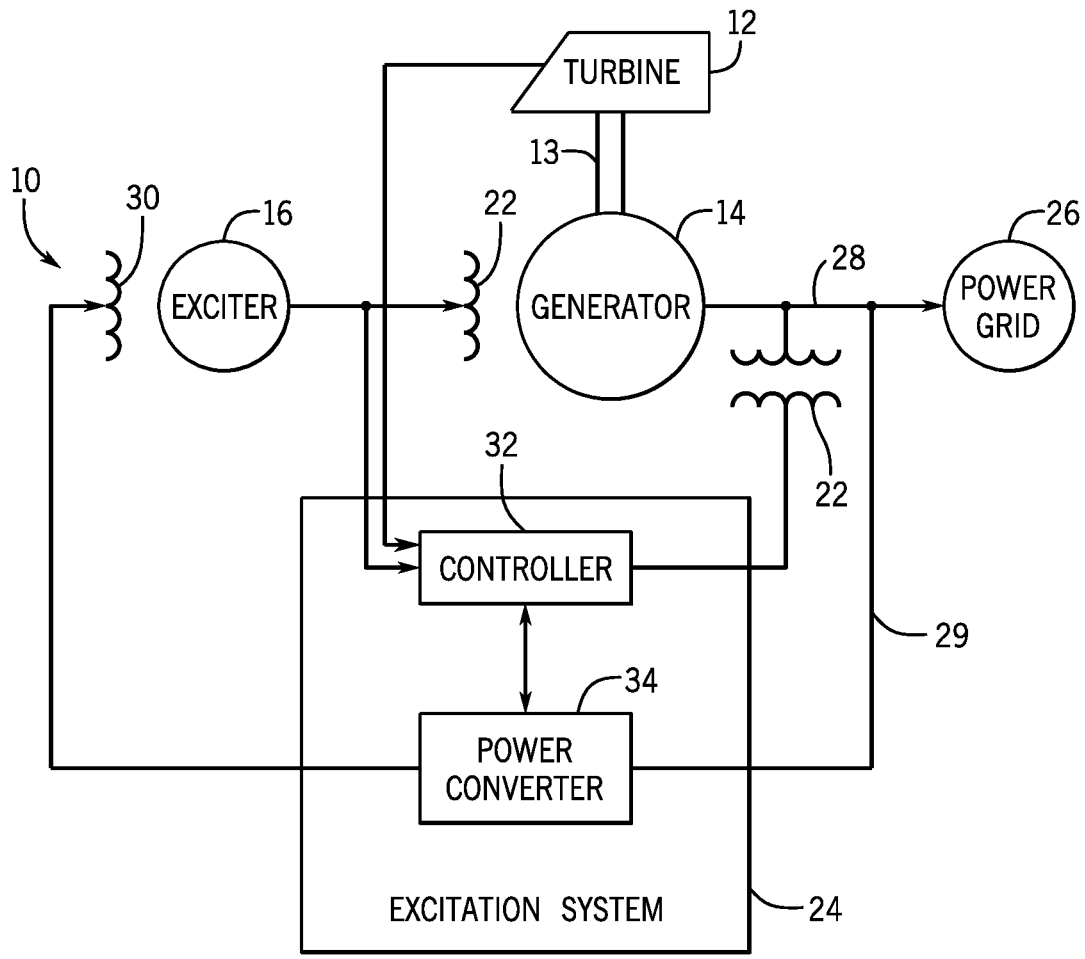
FIG. 1 is a block diagram of an embodiment of a power generating system (e.g., AC power generating system) in accordance with present embodiments.

With the foregoing in mind, it may be useful to describe an embodiment of a power generating system, such as an example power generating system 10 illustrated in FIG. 1.

The power generating system 10 may include various subsystems such as a turbine 12, a generator 14 (e.g., synchronous generator), and an exciter 16. The turbine 12 (e.g., gas turbine, steam turbine, hydroturbine, and the like) may be coupled the generator 14 via a shaft 13. The generator 14 may be in turn communicatively coupled to the generator exciter 16. The exciter 16 may provide a direct current (DC) to field windings 22 of the generator 14. Particularly, the exciter 16 may provide a DC field current (e.g., the current utilized by the field windings 22 of the generator 14 and/or other synchronous machine to establish a magnetic field for operation) to excite the magnetic field of the generator 14. For example, the exciter 16 may be a static (e.g., power electronic) or rotating (e.g., brush and/or brushless) exciter. In other embodiments, the exciter 16 may be bypassed, and a power output may directly energize the field windings 22 of the generator 14. As also depicted, the output terminals of the generator 14 may be coupled to a large scale utility power grid 26 via alternating current (AC) lines 28. Alternatively, the output terminals of the generator 14 may be coupled to a small industrial power generation plant.

The power generating system 10 may also include an excitation system 24, which may provide various control parameters to each of the generator 14 and/or the exciter 16 for example, based on measured parameters and/or indications of measured parameters received at one or more inputs to the excitation system 24. As described in greater detail below, one of these inputs may be a voltage generated by a brushless permanent magnet generator (PMG) coupled to the shaft 13. In certain embodiments, the excitation system 24 may function as an excitation control for the generator 14 and the exciter 16. The excitation system 24 may include one or more controllers 32 and one or more power converters 34. The power converter 34 may include a subsystem of integrated power electronic switching devices such as silicon-controlled rectifiers (SCRs), thyristors, insulated gate bipolar transistors (IGBTs), and so forth, that receive alternating current (AC) power, DC power, or a combination thereof from a source such as, for example, the power grid 26. As described in greater detail below, the power converter 34 may include an automatic voltage regulator (AVR). The excitation system 24 may receive this power via a bus 29, and may provide power, control, and monitoring to the field windings 30 of the exciter 16 based thereon. Thus, the excitation system 24 and the exciter 16 may operate collectively to drive the generator 14 in accordance with a desired output (e.g., grid voltage, power factor, loading frequency, torque, speed, acceleration, and so forth). As an example, in one embodiment, the excitation system 24 may be an excitation controller system, such as the EX2100e™ regulator, available from General Electric Co. of Schenectady, N.Y. As described in greater detail below, a DC-link voltage measured from the AVR may be utilized to monitor and determine low speeds (e.g., 50 RPM or less) of the generator 14 and/or the shaft 13.

Figure 2:
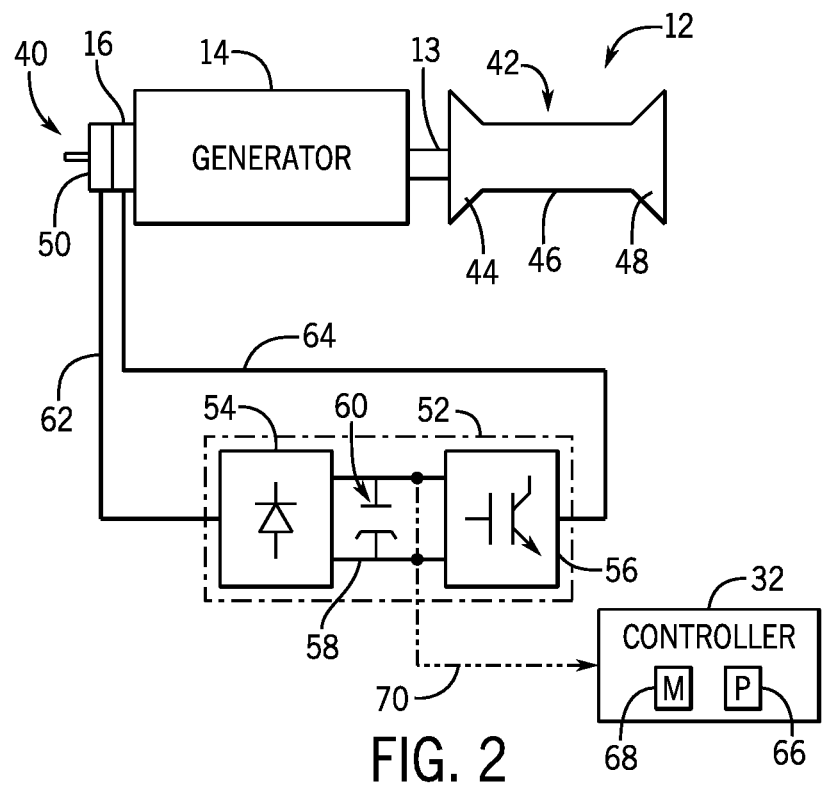
FIG. 2 is a schematic diagram of an embodiment of a power generating system (e.g., AC power generating system) coupled to an automatic voltage regulator (AVR) and controller, in accordance with present embodiments.

Turning now to FIG. 2, the figure illustrates another power generating system 40 (e.g., power synchronization system). In general, the power generation system 40 is as described in FIG. 1. The turbine 12 includes a gas turbine 42 having a compressor 44, combustor 46, and turbine 48. The gas turbine 42 may receive air to be compressed by the compressor 44. The compressed air is mixed with fuel and the air-fuel mixture is combusted in the combustor 46. The combustion mixture of air and fuel may be used to rotate one or more blades of the turbine 48. A rotor of the turbine 48 may be coupled to the shaft 13 to provide rotational energy to the generator 14.

In addition, the power generation system 40 also includes a brushless PMG 50 coupled to the shaft 13. The PMG 50 acts as a power source for the exciter field for the power generating system 40. Further, the power generation system 40 includes an AVR 52 (e.g., an example of the power converter 34 of the excitation system 24 in FIG. 1). The AVR 52 controls the voltage characteristics of the generator 14. Specifically, the AVR 52 changes a generator excitation voltage (e.g., by controlling the magnetic field of the generator 14 via the voltage applied to the coil of the exciter field). The AVR 52 includes a diode rectifier 54 coupled to an inverter 56 via a DC link 58. The DC link 58 includes a capacitor 60 for reducing and smoothing the voltage applied to the inverter 56. The AVR 52 receives the output 62 (e.g., voltage) from the PMG 50. The AVR 52 rectifies the voltage from PMG 50 (i.e., converts from AC to DC) and outputs a voltage 64 to control the exciter field of the exciter 16 and then control the voltage in the generator stator.

As generally illustrated, the controller 32 may include one or more processors 66 and a memory 68, which may be used collectively to support an operating system, software applications and systems, and so forth, useful in implementing the techniques described herein. Particularly, the controller 32 may include code or instructions stored in a non-transitory machine-readable medium (e.g., the memory 68 and/or other storage) and executed, for example, by the one or more processors 66 that may be included in the controller 32. The processor 66 may receive a voltage 70 (e.g., DC-link voltage) measured from the DC link 58. The processor 66 may also utilize the DC-link voltage to determine the speed of the shaft 13 and/or generator 14. The voltage 62 coming from the PMG 50 varies in accordance with the operating frequency of the generator 14 and, thus, the speed of the shaft 13. From this relationship, the speed of the generator 14 may be determined. For example, in certain embodiments, the processor 66 may utilize an algorithmic model or look-up table (e.g., stored on the memory 68) to derive the operating speed of the shaft 13 and/or generator 14 from the DC-link voltage 70. In certain embodiments, processor 66 may determine when the generator 14 has stopped based on the DC-link voltage 70.

Figure 3:
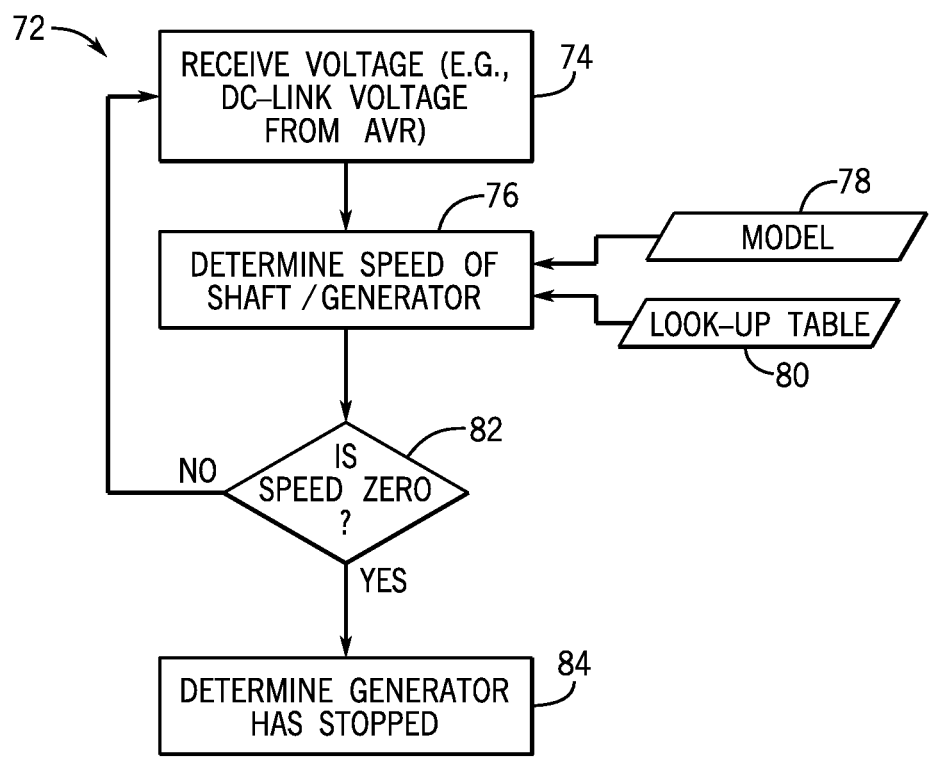
FIG. 3 is a flow diagram of an embodiment of a method for monitoring a speed of a generator of the turbine-generator system of FIGS. 1 and 2, in accordance with present embodiments.

FIG. 3 is a flow diagram of an embodiment of a method 72 for monitoring a speed of a generator of the turbine-generator system of FIGS. 1 and 2. The method 72 may be performed by the controller 32 described above. One or more steps of the method 72 may be performed simultaneously and/or in a different order. The method 72 includes receiving a voltage (e.g., DC-link voltage) directly measured from the DC link of the AVR (block 74), where the voltage is a rectified voltage of the voltage received by the AVR from the PMG. The method 72 also includes determining the speed of the shaft and/or generator of the turbine-generator system based on the DC-link voltage (block 76). Speeds of 50 RPM or less may be detected. For example, a model 78 or a look-up table 80 that takes into account the relationship between the DC-link voltage and the operating frequency of the generator may be utilized to determine the speed of the shaft and/or the generator. The method 72 further includes determining if the speed (e.g., RPM) of the shaft and/or generator is zero (block 82). If the speed is zero, the method 72 includes determining that the generator has stopped (block 84). If the speed is not zero, the method 72 includes continuing to receive the measured DC-link voltage (block 74) and determining the speed of the shaft and/or generator (block 76).

Technical effects of the disclosed embodiments include providing a system and method for detecting and monitoring low speeds (e.g., 50 RPM or less) of a shaft and/or generator in a turbine-generator system. In particular, the DC-link voltage directly measured from the AVR may be utilized to determine the speed of the shaft and/or generator without the need of additional hardware.

This written description uses examples to disclose the disclosed subject matter, including the best mode, and also to enable any person skilled in the art to practice the disclosed subject matter, including making and using any devices or systems and performing any incorporated methods. The patentable scope of the disclosed subject matter is defined by the claims and may include other examples that occur to those skilled in the art. Such other examples are intended to fall within the scope of the claims if they have structural elements that do not differ from the literal language of the claims or if they include equivalent structural elements with insubstantial differences from the literal language of the claims.

The invention claimed is:

1. A control system for a power generation system comprising a generator coupled to a turbine via a shaft, comprising:
   a memory storing instructions; and
   a processor coupled to the memory and configured to execute the instructions, wherein when the instructions are executed, cause the processor to:
   receive a direct current (DC)-link voltage from an automatic voltage regulator (AVR), wherein the AVR is configured to control voltage characteristics of the generator;
   determine a speed of the generator based on the DC-link voltage; and
   determine if the generator has stopped based on the speed of the generator.

2. The control system of claim 1, wherein determining the speed of the generator based on the DC-link voltage comprises determining a speed of the shaft based on the DC-link voltage.

3. The control system of claim 1, wherein the processor is configured, when the instructions are executed, to utilize a mathematical model or a look-up table to determine the speed of the generator based on the DC-link voltage, wherein the mathematical model or the look-up table is configured to utilize a relationship between the DC-link voltage and an operating frequency of the generator to determine the speed of the generator.

4. The control system of claim 1, wherein the turbine comprises a gas turbine.

5. The control system of claim 1, wherein the DC-link voltage comprises a rectified voltage of a voltage received by the AVR from a permanent magnet generator coupled to the shaft.

6. A non-transitory computer-readable medium comprising instructions configured to be executed by a processor of a control system for a power generation system comprising a generator coupled to a turbine via a shaft, wherein the instructions comprise instructions configured to cause the processor to:
   receive a direct current (DC)-link voltage from an automatic voltage regulator (AVR), wherein the AVR is configured to control voltage characteristics of the generator;
   and determine a speed of the generator based on the DC-link voltage utilizing a mathematical model or a look-up table, wherein the mathematical model or the look-up table is configured to utilize a relationship between the DC-link voltage and an operating frequency of the generator to determine the speed of the generator.

7. The non-transitory computer readable medium of claim 6, comprising instructions configured to cause the processor to determine if the generator has stopped based on the speed of the generator.

8. The non-transitory computer readable medium of claim 6, wherein the turbine comprises a gas turbine.

9. The non-transitory computer readable medium of claim 6, wherein the DC-link voltage comprises a rectified voltage of a voltage received by the AVR from a permanent magnet generator coupled to the shaft.

10. A power generation system, comprising:
    a turbine;
    a generator coupled to the turbine via a shaft;
    an automatic voltage regulator (AVR), wherein the AVR is configured to control voltage characteristics of the generator; and
    a controller configured to receive a direct-current (DC)-link voltage from the AVR and to determine a speed of the generator based on the DC-link voltage and to determine a speed of the shaft based on the DC-link voltage.

11. The power generation system of claim 10, wherein the AVR comprises a diode rectifier coupled to an inverter via a DC link, and a capacitor located in the DC link.

12. The power generation system of claim 10, comprising a permanent magnet generator coupled to the shaft, and the DC-link voltage comprises a rectified voltage of a voltage received by the AVR from the permanent magnet generator.

13. The power generation system of claim 10, wherein the turbine comprises a gas turbine and the generator comprises a synchronous generator.

14. The power generation system of claim 10, wherein the controller is configured to determine if the generator has stopped based on the speed of the generator.

15. The power generation system of claim 10, wherein the controller is configured to utilize a mathematical model or a look-up table to determine the speed of the generator based on the DC-link voltage, wherein the mathematical model or the look-up table is configured to utilize a relationship between the DC-link voltage and an operating frequency of the generator to determine the speed of the generator.

* * * * *